E. R. STODDART.
FRUIT PICKER.
APPLICATION FILED JULY 2, 1912.

1,061,138.

Patented May 6, 1913.

Witnesses
M. F. Gannett
James Koch

Inventor
E. R. Stoddart
By Victor J. Evans
Attorney

UNITED STATES PATENT OFFICE.

EDWARD R. STODDART, OF MARKESAN, WISCONSIN.

FRUIT-PICKER.

1,061,138.  Specification of Letters Patent.  Patented May 6, 1913.

Application filed July 2, 1912. Serial No. 707,261.

*To all whom it may concern:*

Be it known that I, EDWARD R. STODDART, a citizen of the United States, residing at Markesan, in the county of Green Lake and State of Wisconsin, have invented new and useful Improvements in Fruit-Pickers, of which the following is a specification.

This invention relates to fruit pickers and has for an object to provide a simple and inexpensive device of this character by means of which apples, pears or like fruit may be gathered or picked in a convenient manner and with a minimum of labor.

Another object of the invention is to provide means whereby the device can be extended to any length as may be desirable to effect a proper handling of the fruit.

A still further object of the invention is to provide a bag support of simple construction which can be readily connected with or removed from the discharge end of the device.

Figure 1:
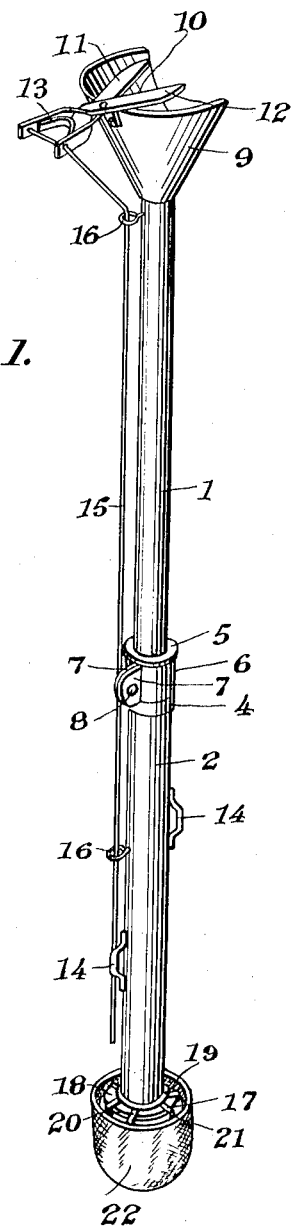
Figure 2:
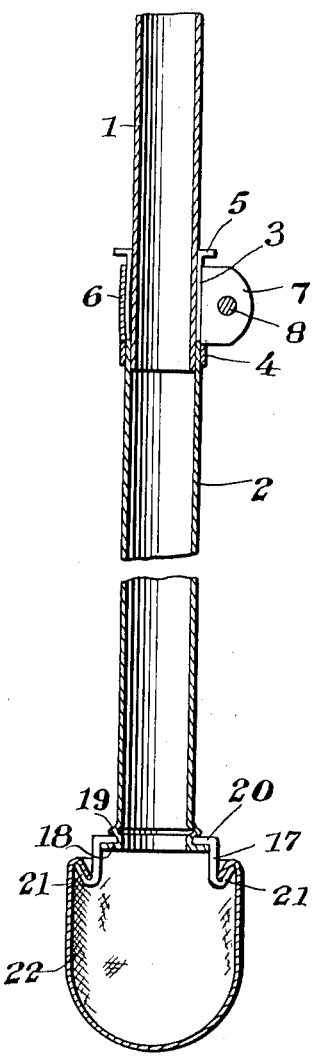

In the drawing forming a portion of this application, and in which like letters of reference indicate similar parts in the several views:—Figure 1 is a perspective view of the fruit picker. Fig. 2 is a longitudinal section through a portion of the picker.

The device preferably comprises upper and lower telescopic tubes 1 and 2, the latter being longitudinally split as at 3 so as to provide relatively movable clamping portions that can be effectually brought into clamping engagement with the tube 1 so as to hold the companion tubes in adjusted positions. A collar 4 is secured to the tube 2, while the upper end of the tube is upset to provide a flange 5, the latter being spaced from the former as shown. A clamp 6 embraces the split portion of the tube 2 and is confined between the collar 4 and the upset portion 5. This clamp is provided with relatively adjustable portions 7 through which a clamp bolt 8 extends and which may be operated whereby the clamp may be brought into effective clamping engagement with the said split portion of the tube. The upper end of the tube 1 is provided with a substantially funnel like portion 9 whereby the device may be readily placed beneath the fruit to be gathered. The top edge of the funnel portion of the device carries a horizontally disposed cutting device 10 which preferably includes a fixed blade 11 and a pivoted blade 12. A spring 13 is operatively associated with the companion blades of the cutter so as to hold them normally in opened positions.

The lower tube 2 is provided with a plurality of hand grips 14 and adjacent to one of the grips is an actuating cord 15. The cord is extended through suitable guide eyes 16 of the companion tubes and at one terminal it is connected with the movable blade of the cutter whereby the same may be operated and made to assist in the action of a fixed blade of the cutter in severing the fruit from the stem. It is evident that when the stem of the fruit is clipped the fruit will be permitted to fall into the funnel portion 9 of the device and then conveyed to the discharge end of the tube 1.

With a view to collecting a quantity of fruit I provide the lower or discharge end of the tube 2 with a bag support 17 the discharge end of the tube being upset as at 18 to provide a flange and at 19 the tube is upset to provide a bead. The said bag support 17 comprises a strand of wire adapted to be bent to provide at its upper end an inwardly directed flange 20, and at its lower end a series of outwardly directed hooks 21, the purpose of which will be later described. The bead is spaced from the flange 18 so as to form a retainer or concentric groove 19' for the flange 20 of the bag support, the flange 18 of the tube being designed to form a stop or rest and to assist in the action of the bead 19 in holding the support against longitudinal movement. The hooks 21 formed at the lower end of the bag support, are arranged in an annular series, and are adapted to receive the walls of the bag 22 for holding the open end of the bag in fruit receiving proximity with the discharge end of the tube 2. The said hooks are disposed in an upwardly and outwardly inclined direction, thereby holding the bag at a point between the opposite walls of the hooks 21 and a portion of the bag support 17.

From the construction of the device described it is evident that fruit may be picked successfully in an expeditious manner and with the minimum labor.

I claim:—

1. A fruit picker comprising a tube, a horizontally disposed cutting device at one end of the tube, the other end of the tube having spaced portions defining therebetween a concentric groove, a support having its upper end formed with a flange, and its lower end formed with a series of annular hooks, the said flange being disposed within the concentric groove of the tube, and a member detachably engaged with the series of annular hooks of the support.

2. A fruit picker comprising a tube, a cutting device at one end of the tube, the other end of the tube having spaced portions defining therebetween a concentric groove, and a bag support disposed within the said groove and comprising a strand of wire having its upper end bent at right angles to form an annular flange, and its lower end bent upwardly and outwardly in opposite directions to its upper end to provide a series of annular hooks for detachably receiving the bag.

In testimony whereof I affix my signature in presence of two witnesses.

EDWARD R. STODDART.

Witnesses:
RALPH CLARK,
IRA W. PARKER.